UNITED STATES PATENT OFFICE.

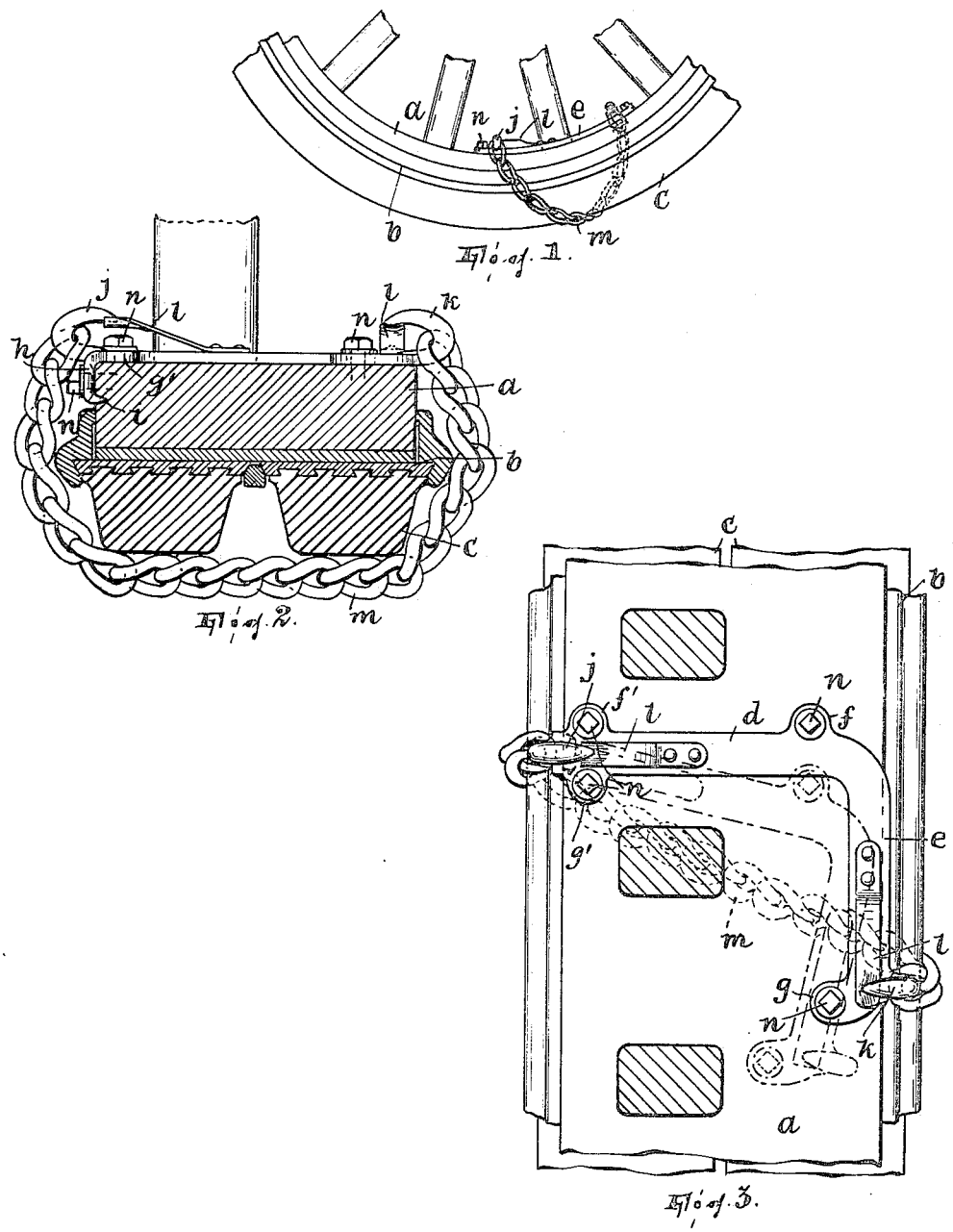

ANSON E. CARLTON, OF PATERSON, NEW JERSEY.

ANTISKID DEVICE.

1,282,186.   Specification of Letters Patent.   Patented Oct. 22, 1918.

Application filed March 20, 1918. Serial No. 223,526.

*To all whom it may concern:*

Be it known that I, ANSON E. CARLTON, a citizen of the United States, residing at Paterson, in the county of Passaic and State of New Jersey, have invented certain new and useful Improvements in Antiskid Devices, of which the following is a specification.

This invention relates to anti-skid devices for wheels in which chains or their equivalent are used as the ground gripping means. It is very desirable to arrange the chains obliquely of the tread of the wheel so as to reduce the vibration and also reduce the freedom of the chains and consequently their incidental noise and wear and tear on the wheel as well as the parts of the device itself. To accomplish this in such a way that the degree of obliqueness of the chains will be sufficient properly to serve the purpose and that the device may be used with wheels whose spokes are arranged very closely together I have provided an angular anchorage member having means on its arms whereby to attach the chain thereto and adapted to be secured to the inside face of the felly of the wheel so that one arm extends across the same and the other relatively longitudinally thereof. This member is preferably constructed in a way calculated to render it secure and make necessary the employment of the least number of screws or equivalent for holding it in place.

In the drawing,

Figure 1 is a fragmentary side view of a wheel equipped with my anti-skid device;

Fig. 2 is a transverse section of the wheel, showing the device in place; and

Fig. 3 is a sectional view of a fragment of a wheel equipped with my device, looking toward the inside of the felly of the wheel.

The wooden felly of a spoked wheel is indicated at $a$; its sectional rim at $b$; and the rubber tire or tires at $c$. The device is applicable to any other type of spoked wheel than that shown.

The anchorage member consists of a suitable length of metal, preferably of greater width than thickness, of angular form. Its two arms $d$ and $e$ are of such length that the former will reach well across the widest of fellies of several widths while the latter arm has at least preferably about the same length as the former.

Near the angle there is a projection or ear $f$ and at the free end of the arm $e$ there is an inwardly projecting ear $g$ in the adaptation herein illustrated; on the opposite sides of arm $d$ are two other ears $f'$ $g'$.

The free end of the arm $d$ is bent out of the general plane of the anchorage member, as at $h$, and then rebent and sharpened to form a spur $i$.

The bent-out portion $h$ and the ears $f$ $g$ $f'$ $g'$ are provided with suitable holes to receive the attaching screws as hereinafter explained.

At the free end of the arms $d$ and $e$, respectively, are provided the hooks $j$ and $k$. Bearing against the ends of the hooks are the plate springs $l$, preferably riveted to the anchorage member and extending longitudinally of the arms thereof.

$m$ is the chain, the same having its end links engaged with the attaching means therefor afforded by the hooks.

The device is secured in place preferably by lag-screws $n$, one entered through the hole in the end portion $h$ and the others through the holes in the ears $f$ $g$ $f'$ $g'$. Having positioned the anchorage member as shown best in Fig. 3, so that arm $d$ extends transversely of the felly between two spokes and arm $e$ relatively longitudinally of the felly, and having, as by a blow with a hammer, driven the spur $i$ into the wood of the felly, the screws $n$ are driven into the felly to hold the anchorage member in place. Much of the hold which the device obtains on the felly is obviously due to the engagement of the anchorage member, by means of its spur, with the felly.

The angular form of the anchorage member not only permits the device to be attached to wheels having their spokes very closely arranged and yet obtain the desired obliqueness of the chain, but makes it possible to apply the device to fellies varying considerably in width; that is, the anchorage member may be secured to quite as good advantage in the position, for instance, in which it appears in dotted lines in Fig. 3, as in the full line position in said figure.

Having thus fully described my invention, what I claim as new and desire to secure by Letters Patent is:—

1. In combination, with the felly of a wheel, an angular anchorage member secured to the inside face of the felly with one arm extending across and the other longitudinally of said face and having chain-attaching means on each arm, and a chain extending around the felly relatively outwardly thereof and attached at its ends to said means.

2. In combination, with the felly of a wheel, an angular anchorage member secured to the inside face of the felly with one arm extending across and the other longitudinally of said face and having chain-attaching means on each arm, and a chain extending around the felly relatively outwardly thereof and attached at its ends to said means, one arm of said member bearing against a side face of the felly.

3. In combination, with the felly of a wheel, an angular anchorage member arranged against the inside face of the felly with one arm extending across and the other longitudinally of said face and having chain-attaching means on each arm, a chain extending around the felly relatively outwardly thereof and attached at its ends to said means, one arm of said member having a spur to engage in a side face of the felly, and means to secure said member to the felly holding the spur engaged in said side face.

In testimony whereof I affix my signature.

ANSON E. CARLTON.